United States Patent [19]
Noto

[11] Patent Number: 5,925,297
[45] Date of Patent: *Jul. 20, 1999

[54] CONTINUOUS LAMINATING OR MOLDING PROCESS

[75] Inventor: Vincent H. Noto, San Diego, Calif.

[73] Assignee: Tetrahedron Associates, Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,054

[22] Filed: Nov. 13, 1996

[51] Int. Cl.⁶ .................................................. B29C 69/02
[52] U.S. Cl. ........................... 264/83; 264/102; 264/322; 264/500; 156/286
[58] Field of Search .................................. 264/101, 102, 264/83, 320, 322, 500, 570, 571; 156/285, 286

[56] References Cited

U.S. PATENT DOCUMENTS

| | | | |
|---|---|---|---|
| 2,978,376 | 4/1961 | Hulse | 264/102 |
| 3,317,641 | 5/1967 | Heier | 264/102 |
| 4,007,245 | 2/1977 | Scola | 264/101 |
| 4,030,953 | 6/1977 | Rutschow et al. | 264/101 |
| 4,132,755 | 1/1979 | Johnson | 264/102 |
| 4,217,157 | 8/1980 | Stoltze et al. | 264/102 |
| 4,217,318 | 8/1980 | Anderson | 264/85 |
| 4,357,193 | 11/1982 | McGann et al. | 156/286 |
| 5,013,514 | 5/1991 | Azzani et al. | 264/512 |
| 5,037,599 | 8/1991 | Olson | 264/510 |
| 5,578,158 | 11/1996 | Gutowski et al. | 156/285 |
| 5,618,606 | 4/1997 | Sherrick et al. | 156/286 |
| 5,630,971 | 5/1997 | Ophir | 264/101 |
| 5,635,013 | 6/1997 | Boi | 156/285 |

*Primary Examiner*—Jan H. Silbaugh
*Assistant Examiner*—Mark Eashoo
*Attorney, Agent, or Firm*—Henri J.A. Charmasson; John D. Buchaca

[57] ABSTRACT

In the manufacture of molded or laminated articles from composite materials such as fiber-reinforced and carbon or metal-loaded resins, the vacuum plastic bag or other air-tight barrier commonly used during the pressing, heating and curing phases is eliminated. Instead the various process cycles are conducted in one or more fluid-tight pressurizable chamber under various types of atmospheres to eliminate air pockets, vaporize and evacuate moisture and residual solvents, and suppress surface bubbling and frothing of pressed out fluids.

9 Claims, 2 Drawing Sheets

CONTINUOUS LAMINATING OR MOLDING PROCESS

FIELD OF THE INVENTION

This invention relates to the processes of molding and laminating materials and articles made from thermoplastic and thermosetting materials.

BACKGROUND OF THE INVENTION

In the process of laminating or molding structures made from plastic composite materials such as fiber-reinforced resins, care must be taken to eliminate internal voids resulting from the entrapment in the material of air pockets or of gas bubbles formed by the vaporization of moisture, solvents and other residual volatile components.

Air pockets can be formed during the mixing and pouring of the material. Gas bubbles occur mainly during heating and curing phases of the processes.

Until now the most common and practical method for eliminating internal voids has been to enclose the mass of material being molded or laminated into a fluid-tight envelope, typically a bag of plastic sheet material connected to a vacuum pump. Air pockets and gas bubbles which may form in the plastic material are sucked out by the vacuum pump during exposure to internal pressure of an autoclave, and during the pressing, molding and curing cycles. The envelope also acts as a barrier against reentry of air or other ambient gas after the vacuum pull is interrupted or terminated during handling of the material between cycles.

The plastic bag or other fluid-tight envelope is a cumbersome element that, not only impairs the convenient manipulation of the material throughout the various manufacturing cycles, but can also result in the formation of flaws over the surface of the manufactured articles due to folds and creases in the envelope material.

The instant invention results from attempts to palliate the above-described inconvenience and problems by avoiding the need of any vacuum bag or other fluid-tight barrier between the composite material and the surfaces of the laminating or molding implements.

SUMMARY OF THE INVENTION

The principal and secondary objects of this invention are to improve and expedite the laminating, molding and curing processes in the manufacture of articles made of thermoplastic or thermosetting resins and composites by replacing the use of vacuum bags and other fluid barriers with a controlled atmosphere which can be changed from vacuum to ambient or pressurized gas as may be required during the successive manufacturing processes. These and other valuable objects are achieved through the use of air-tight and pressurizable laminating, molding, and curing chambers.

DESCRIPTION OF THE PREFERRED EMBODIMENT OF THE INVENTION

Figure 1:
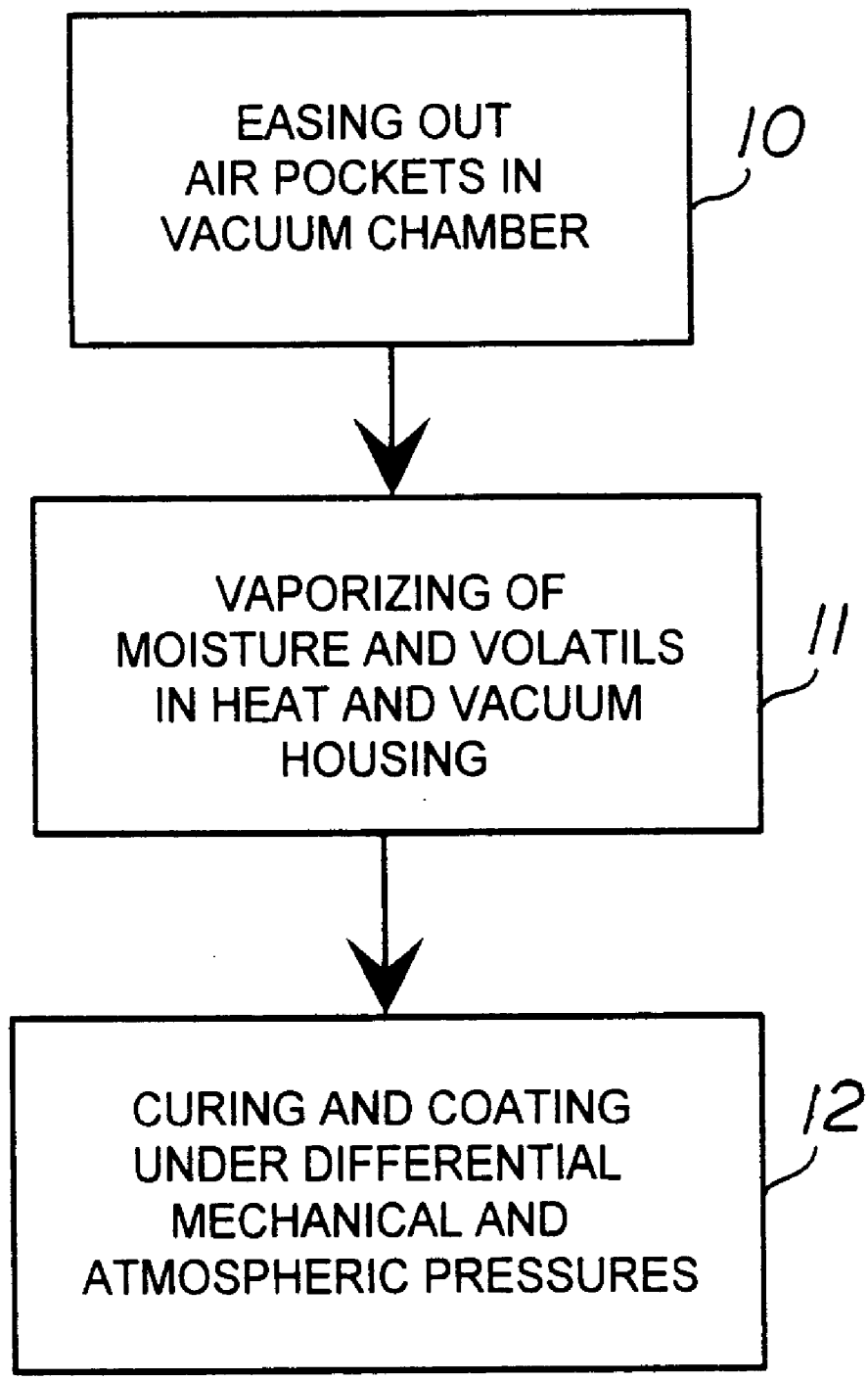
FIG. 1 is a block diagram of the various processes.

The various processes disclosed herein as part of the preferred embodiment and practice of the invention are applicable to the manufacture of various articles, and materials out of a variety of thermoplastic or thermosetting, synthetic or organic or natural plastic materials such as fiber-reinforced resins, as well as other composites made of carbon or metal-loaded resin matrices. These objects and materials can either be molded to a particular shape such as fishing poles made from fiber-reinforced polyester resin, or they can be laminated to discrete sheets such as a laminated plastic coating material. Others whether molded or laminated may combine composite resins and other metal, or nonmetallic components such as printed circuit boards for electronic assemblies where layers of copper trace circuits are sandwiched between layers of epoxy or other resin material.

These various processes will be described with references to the drawing.

The first process 10 comprises in the elimination of air pockets which may be entrapped in the composite material while it is still in its viscous state. This process is preferably conducted in an airtight chamber in which vacuum has been established. In such a chamber, a volume of the viscous composite material is exposed to the vacuum environment of the chamber, and may, in certain cases, be made subject to a light mechanical pressure by means of a press during a time period sufficient to ease out pockets of air or other gas toward the surface of the volume where the air or gas is sucked away by the vacuum pump connected to the chamber.

A second process 11 comprises the vaporization of any moisture or solvent within the volume material. This is preferably done in a fluid-tight housing also connected to a vacuum pump, and in which the temperature of the volume of material can be raised to a level sufficient to vaporize the moisture and the residual solvents. As bubbles of vapor or other volatiles rise to the surface of the material, they are also sucked away by the vacuum pump.

It should be understood that this second process can be performed independently and separately from the first easing out process 10, or simultaneously in the same enclosure.

A third process 12 consists of curing the volume of material to the desired shape and hardness while preventing fluids from reentering the volume of material, and of suppressing any surface bubbling or frothing resulting from the pressing out of the material of residual fluids. This third process is also done in a fluid-tight enclosure by applying to the volume of material, a mechanical pressure by means of laminating platens or inner surfaces of a mold while at the same time maintaining an ambient atmosphere of active or inactive gas under a pressure slightly below the mechanical pressure exerted by the platens or mold. This ambient pressure prevents bubbling or frothing formation on the surface of the material. It is maintained for the curing time necessary to solidify the volume of material to a hardness sufficient to prevent reentry of any fluid into the material.

It must again be understood that this third process 12, although it must be performed subsequently to the two previously described processes, can be done in separate enclosures or in the same chamber as the first and second processes.

Figure 2:
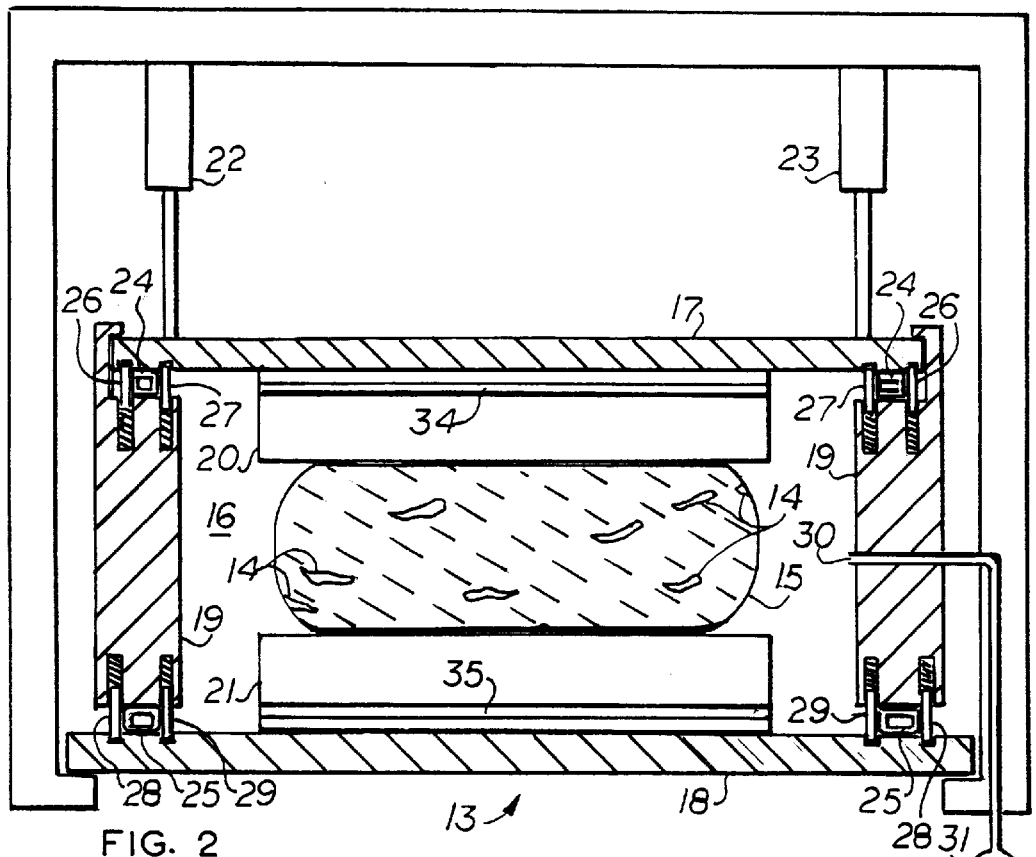
FIG. 2 is a diagrammatical illustration of a first type of fluid-tight and pressurizable chamber.

The device illustrated in FIG. 2 is a fluid-tight pressing and heating chamber 13 suitable to the practice of the invention. This chamber is shown in connection with the practice of the first process 10 of eliminating air pockets 14 out of a volume 15 of composite material. The fluid-tight enclosure 16 comprises a movable ceiling plate 17, a stationary floor plate 18, and a peripheral wall 19. The composite material 15 is held between an upper platen 20 and the lower platen 21 respectively associated with the ceiling plate 17 and floor plate 18 in the absence of any vacuum bag or other fluid barrier in contact with the composite material. The peripheral wall 19 is slidingly connected along its upper edge to the ceiling plate 17. The peripheral wall and upper platen can be forceably raised and lowered by a pair of hydraulic cylinders 22, 23. At the upper and lower edges of the peripheral wall 19, compressible seals 24, 25 and spring-biased extensible seal guards 26, 27 and 28, 29 provide air-tight connections with the ceiling plate 17 and floor plate 18. The seals are made of heat-resistant material and can be of a solid resilient core or have an inflatable hollow core depending upon the extent of compression desired. The extensible guards 26, 27 and 28, 29 prevent the seals from expanding sideward under pressure.

A fluid access port 30 in the peripheral wall 19 is controlled by a valve 31 which either admits on one of its ports air or an external gas 32 or give access to a vacuum pump 33.

The floor plate 18 can be a permanently fixed part of the chamber 13, or be a removable carrier plate used to move the volume of material 15 from one processing station to another. Heating elements 34, 35 can be applied against either the ceiling plate 17 or the floor plate 18 or to both simultaneously.

The mechanical pressure applied by the hydraulic cylinders 22, 23, the ambient pressure resulting from the admission of an external gas into the chamber, and the internal temperature are preferably adjusted and regulated according to well-known principles and techniques common to the art of laminating and molding presses.

Figure 3:
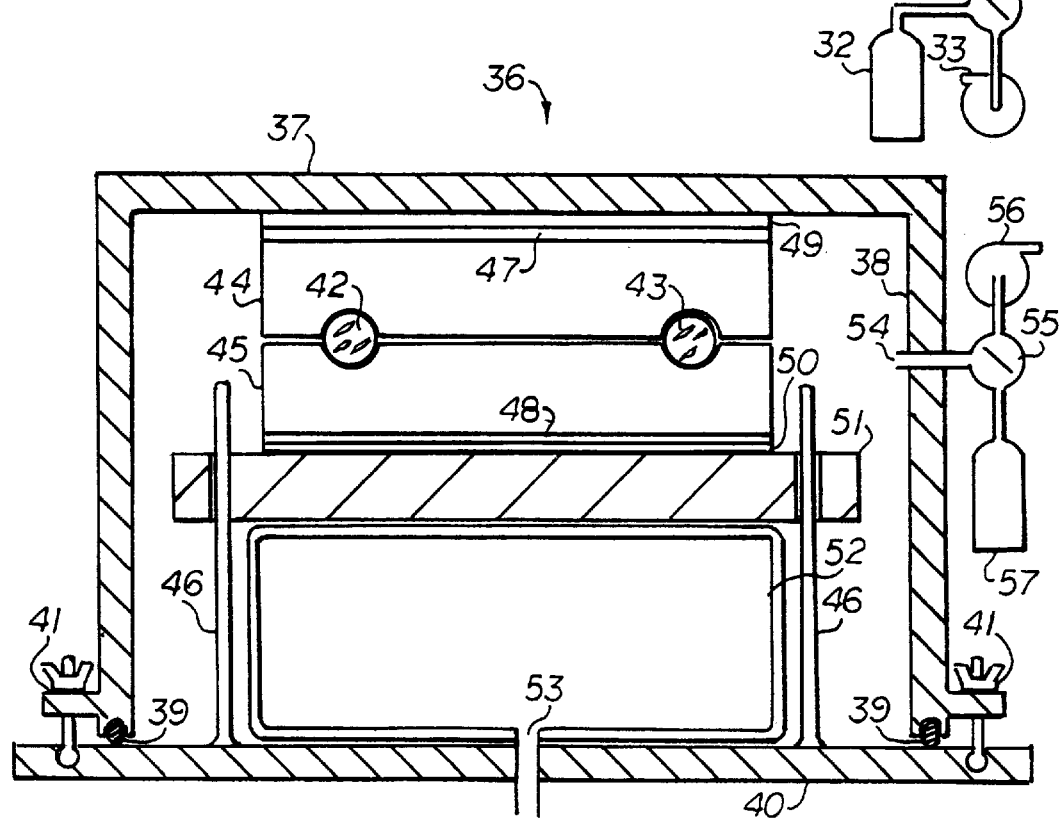
FIG. 3 is a diagrammatical illustration of a second type thereof.

In the second type 36 of fluid-tight pressing and heating chamber illustrated in FIG. 3, the ceiling plate 37 and peripheral wall 38 are integrally connected. A simple gasket-type seal 39 made of neoprene or comparable elastomeric material is provided at the base of the peripheral wall for hermetic contact with the floor plate 40 to which the peripheral wall is releasably bolted by means of a series of clamps 41. Distinct volumes of composite materials 42, 43 are held within shaping cavities in opposite surfaces of mating mold halves 44, 45. Heating elements 47, 48 and their respective insulating shields 49, 50 are mounted against the outer surface of the mold. Mechanical pressure is provided upon the mold and upon the volumes of material by movement of a support plate 51 along vertical guides 46 when the underlying bladder 52 is inflated through port 53.

As disclosed in connection with the earlier described chamber 10, a port 54 controlled by a three-position valve 55 provides connection to a vacuum pump 56 and for admission of air or other gas 57 through the peripheral wall 38.

During the curing process 12, the pressurized gas admitted into the chamber can be either passive or an active gas capable of reacting with the outer surface of the volumes of composite material to form an outer coating.

It should be understood that either one of the two types of chambers 13, 36 can be used to practice either one or all of the three processes earlier described in the absence of any vacuum bag or other pliable barrier between the composite material and the laminating or molding structures.

It should be understood also that a series of such chambers can be used successively to perform each of the processes sequentially on each article to be manufactured, and simultaneously on a series of articles in order to assure a continuous manufacturing flow.

The above-described chambers can be modified in shape, size and function in order to accommodate stacks of composite volumes separated by appropriate layers of platens and heaters and for other methods common to the laminating and molding processes.

While the preferred embodiments of the invention have been described, modifications can be made and other embodiments may be devised without departing from the spirit of the invention and the scope of the appended claims.

What is claimed is:

1. The process for forming an article from thermoplastic or thermo-setting materials which comprises the seps of:

curing a volume of at least one of said materials in a viscous state to hardness to form said article;

wherein the step of curing comprises, in a pressurizable enclosure and under curing temperature, applying to said volume a mechanical pressure by means of at least one pressing surface while maintaining in said enclosure an ambient atmosphere of active or inactive gas under a pressure slightly below said mechanical pressure, but sufficient to prevent surface frothing of residual fluids, for a time necessary to solidify the volume of material to a hardness sufficient to prevent reentry of fluids into said volume.

2. The process of claim 1 which further comprises, before said step of curing, in a fluid-tight housing, subjecting said volume in a viscous state to a substantially vacuum atmosphere during a period sufficient to ease gases out of said volume and heating said volume to a temperature sufficient to vaporize moisture and residual solvents without using any fluid-tight barrier in contact with said volume.

3. The process of claim 2, wherein said steps of subjecting, heating, and curing are performed in a single fluid-tight and pressurizable enclosure.

4. The process of claim 2, wherein said steps of subjecting and heating are performed simultaneously in a single fluid-tight enclosure.

5. The process of claim 2, wherein said steps of subjecting and applying comprise pressing said volume between internal surfaces of a mold.

6. The process of claim 2, wherein said steps of subjecting and applying comprise pressing said volume between a pair of platens having flat contact surfaces.

7. The process of claim 2, wherein said step of applying comprises admitting into said enclosure a gas capable of reaction with said material.

8. The process of claim 7, wherein said step of admitting comprises coating said volume by reaction of said gas with a surface layer of said material.

9. The process of claim 2, wherein said step of heating comprises applying heat to said volume through said pressing surface.

* * * * *